United States Patent
Uenishi

(10) Patent No.: US 9,282,234 B2
(45) Date of Patent: Mar. 8, 2016

(54) FOCUS ADJUSTMENT APPARATUS AND METHOD, AND IMAGE CAPTURING APPARATUS

(71) Applicant: CANON KABUSHIKI KAISHA, Tokyo (JP)

(72) Inventor: Masaaki Uenishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 98 days.

(21) Appl. No.: 14/104,269

(22) Filed: Dec. 12, 2013

(65) Prior Publication Data

US 2014/0168467 A1    Jun. 19, 2014

(30) Foreign Application Priority Data

Dec. 17, 2012  (JP) .................................. 2012-275106

(51) Int. Cl.
| | |
|---|---|
| *H04N 5/232* | (2006.01) |
| *H04N 9/73* | (2006.01) |
| *G02B 7/28* | (2006.01) |

(52) U.S. Cl.
CPC ............... *H04N 5/23212* (2013.01); *G02B 7/28* (2013.01)

(58) Field of Classification Search
CPC .......... H04N 5/23212; H04N 5/23219; H04N 5/217; H04N 5/2621; G03B 13/36; G06T 5/005

USPC ............. 348/207.1, 222.1, 223.1, 224.1, 345, 348/349

See application file for complete search history.

(56) References Cited

U.S. PATENT DOCUMENTS

| | | | | |
|---|---|---|---|---|
| 2006/0072915 A1* | 4/2006 | Onozawa | ................. | G02B 7/28 396/121 |
| 2009/0175555 A1* | 7/2009 | Mahowald | ......... | H04N 5/23232 382/274 |

FOREIGN PATENT DOCUMENTS

| | | |
|---|---|---|
| JP | 2006-254191 A | 9/2006 |
| JP | 2012-093409 A | 5/2012 |

* cited by examiner

*Primary Examiner* — Trung Diep
(74) *Attorney, Agent, or Firm* — Cowan, Liebowitz & Latman, P.C.

(57) ABSTRACT

A focus adjustment apparatus comprises: a focus adjustment unit configured to execute focus adjustment processing by driving a focus lens based on focus evaluation values calculated respectively for periodically sensed images while scanning the focus lens within a predetermined scan range; a first processing unit configured to execute processing, an operation of which is affected by driving of the focus lens; a second processing unit configured to execute processing, an operation of which is not affected by driving of the focus lens; a determination unit configured to determine a start position of the scan range; and a control unit configured to control the first processing unit to execute the processing before the focus lens is scanned to the start position, and controls the second processing unit to execute the processing during the scan of the focus lens to the start position.

14 Claims, 9 Drawing Sheets

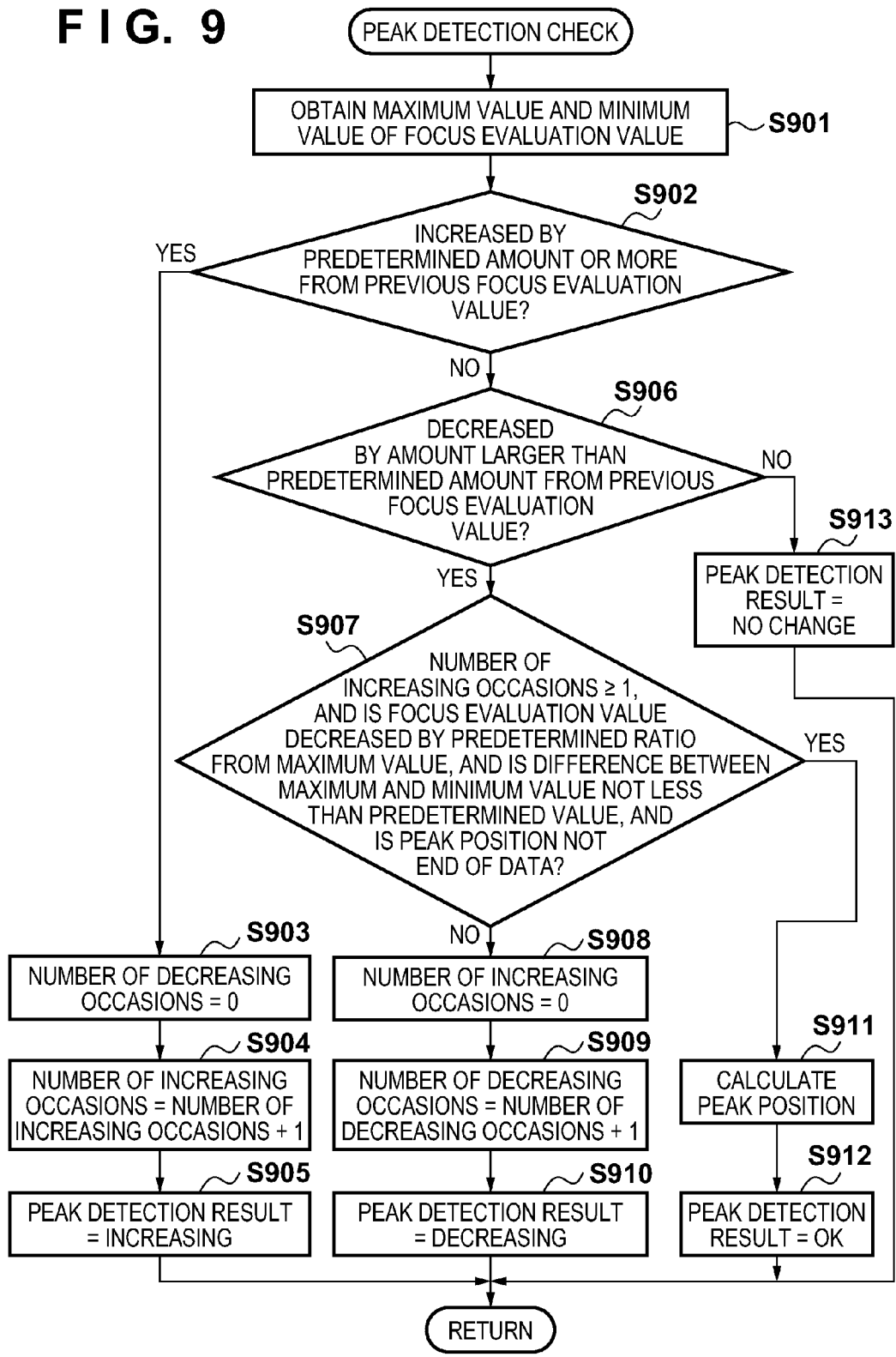

FOCUS ADJUSTMENT APPARATUS AND METHOD, AND IMAGE CAPTURING APPARATUS

BACKGROUND OF THE INVENTION

1. Field of the Invention

The present invention relates to a focus adjustment apparatus and method, and an image capturing apparatus and, more particularly, to a focus adjusting technique by a focus adjustment apparatus used in an image capturing apparatus such as a digital still camera and video camera.

2. Description of the Related Art

Conventionally, as a method of adjusting a focal point on an object by driving a focus lens in a digital still camera or the like, an AF (Auto Focus) method of automatically performing a focusing operation using an image signal obtained from an image sensor such as a CCD is used. When this AF method is used, processes such as photometry processing for AE (Auto Exposure) control, AE control, WB (White Balance) control, and a change to signal read-out control of the image sensor suited to the AF control are executed in response to, for example, a photographing preparation instruction operation such as pressing of a shutter button to a half-stroke position. After these processes, the AF control based on the aforementioned AF method is executed.

In one related art using this AF method, the photometry processing before the AF control and scan control of the focus lens to an operation start position of the AF control are parallelly executed to shorten an AF time lag (for example, see Japanese Patent Laid-Open No. 2006-254191). In another related art, an AF time lag is shortened by determining the operation start position of the AF control, the scan speed of the focus lens, and a focus detection area based on the AF evaluation value acquired during a scan of the focus lens to an AF scan start position (for example, see Japanese Patent Laid-Open No. 2012-093409).

However, with the method of Japanese Patent Laid-Open No. 2006-254191, since the photometry processing is executed during a scan of the focus lens to the operation start position of the AF control, a luminance variation due to the scan of the focus lens affects the photometry precision. On the other hand, with the method of Japanese Patent Laid-Open No. 2012-093409, the scan control of the focus lens to the operation start position of the AF control is not parallelly executed with photometry processing, AE control, WB control, and the change to the signal read-out control of the image sensor suited to the AF control. For this reason, when an AF evaluation value acquired during a scan to the operation start position of the AF control cannot be effectively used, a scan time of the focus lens is wasted.

SUMMARY OF THE INVENTION

The present invention has been made in consideration of the above situation, and efficiently shortens an AF time lag without affecting processing other than AF control.

According to the present invention, provided is a focus adjustment apparatus comprising: a focus adjustment unit configured to execute focus adjustment processing by driving a focus lens based on focus evaluation values calculated respectively for periodically sensed images while scanning the focus lens within a predetermined scan range; a first processing unit configured to execute processing, an operation of which is affected by driving of the focus lens; a second processing unit configured to execute processing, an operation of which is not affected by driving of the focus lens; a determination unit configured to determine a start position of the scan range; and a control unit configured to control the first processing unit to execute the processing before the focus lens is scanned to the start position, and to control the second processing unit to execute the processing during the scan of the focus lens to the start position.

According to the present invention, provided is an image capturing apparatus comprising: an image sensor configured to sense the image; and a focus adjustment apparatus as described above.

According to the present invention, provided is a focus adjustment method of executing focus adjustment processing by driving a focus lens based on focus evaluation values calculated respectively for periodically sensed images while scanning the focus lens within a predetermined scan range, the method characterized by comprising: a determination step of determining a start position of the scan range; a first processing step of executing processing, an operation of which is affected by driving of the focus lens, before the focus lens is scanned to the start position; and a second processing step of executing processing, an operation of which is not affected by driving of the focus lens, while the focus lens is scanned to the start position.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 9 is a flowchart for explaining peak detection check processing according to the embodiment.

DESCRIPTION OF THE EMBODIMENTS

Exemplary embodiments of the present invention will be described in detail in accordance with the accompanying drawings.

Figure 1:
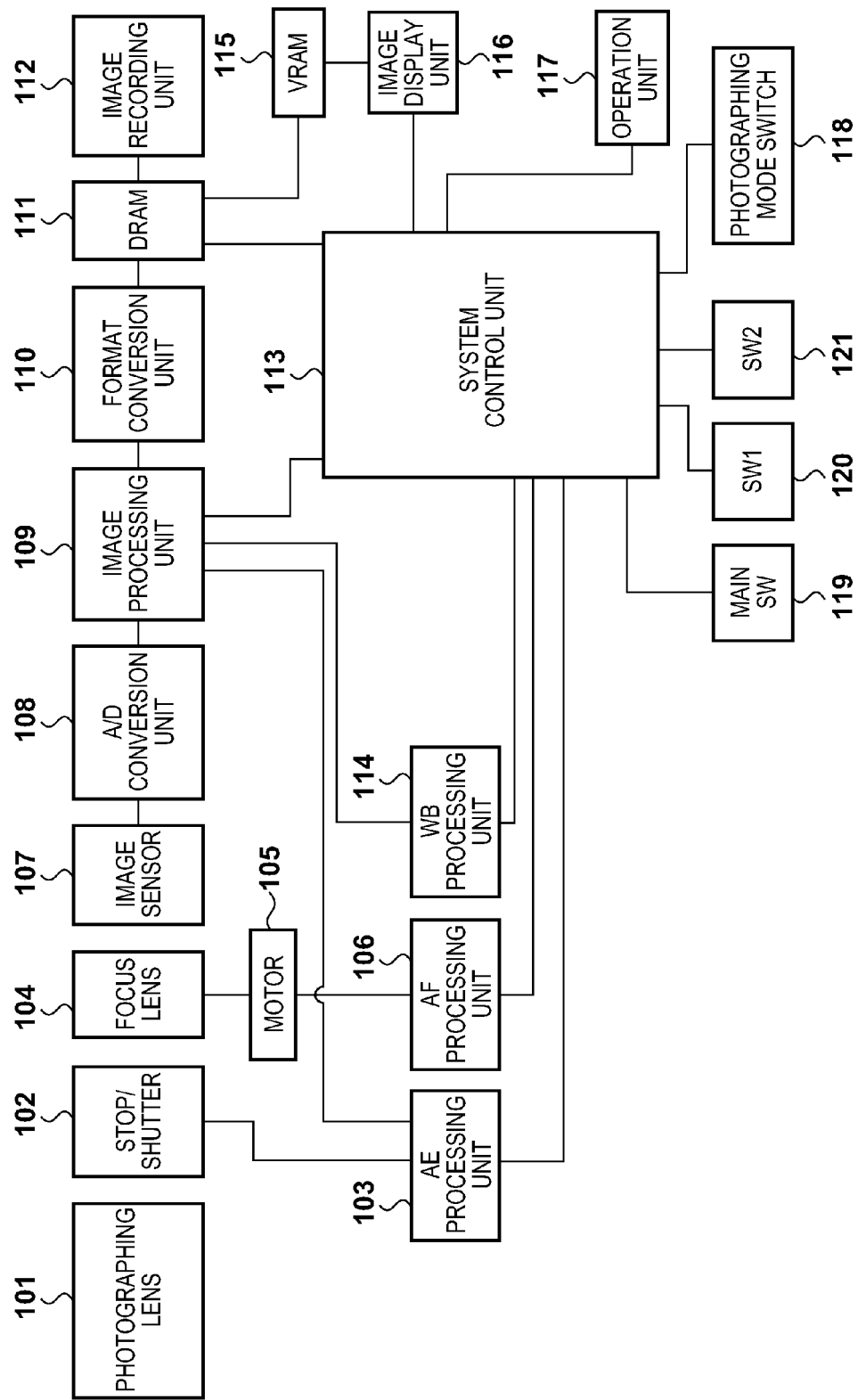
FIG. 1 is a block diagram showing a configuration of an image capturing apparatus according to an embodiment of the present invention.

FIG. 1 is a block diagram showing a configuration of a digital camera as an image capturing apparatus according to an embodiment of the present invention. Referring to FIG. 1, reflected light from an object, which enters via a photographing lens 101 including a zoom mechanism and a stop/shutter 102 required to control a light amount, is imaged on an image sensor 107 by a focus lens 104. The image sensor 107 receives the imaged light, converts it into an electrical signal, and output the converted signal to an A/D conversion unit 108. The A/D conversion unit 108 includes a CDS circuit required to reduce output noise from the electrical signal output from the image sensor 107, a non-linear amplifier to be activated before A/D conversion, and an A/D conversion circuit required to execute A/D conversion, and outputs an image signal converted into a digital signal to an image processing unit 109.

The image processing unit 109 applies predetermined image processing such as gamma conversion to the image signal output from the A/D conversion unit 108, and a format conversion unit 110 converts the processed signal to a format suited to recording or display. Then, the image signal is stored in an internal memory 111. The internal memory 111 is, for example, a high-speed memory such as a random access memory, and will be referred to as a "DRAM" hereinafter. The DRAM 111 is used as a high-speed buffer as a temporary image storage unit or a work memory for compression/decompression of an image. An image recording unit 112 includes a recording medium such as a memory card, and its interface, and records an image and the like via the DRAM 111. An image display unit 116 makes a display for operation assistance, that of a camera state, and that of a photographing frame and focus detection area at an image sensing timing in addition to an image via an image display memory 115 (to be referred to as a "VRAM" hereinafter).

An operation unit 117 allows the user to externally operate the camera, and includes, for example, the following switches. That is, the operation unit 117 includes a menu switch used to make various settings including a photographing function of the image capturing apparatus, an image reproduction setting, and the like, a zoom lever used to instruct a zoom operation of the photographing lens 101, an operation mode changeover switch for a photographing mode and reproduction mode, and the like. A photographing mode switch 118 is used to select a photographing mode such as a micro mode, distant view mode, and sports mode. In this embodiment, an AF scan range, AF operation, and the like are changed according to the photographing mode selected by the user. The camera further includes a main switch 119 used to turn on a power source of a system, a switch 120 (to be referred to as "SW1" hereinafter) used to make a photographing preparation operation such as AF and AE, and a photographing switch 121 (to be referred to as "SW2" hereinafter) used to execute a photographing operation after the operation of the SW1.

A system control unit 113 controls the overall system such as a photographing sequence. An AE processing unit 103 executes photometry processing for an image signal which has undergone the image processing and is output from the image processing unit 109, so as to calculate an AE evaluation value (photometry result) for exposure control, and then attains exposure control by controlling a shutter speed, aperture, and sensitivity. Note that when the image sensor 107 includes an electronic shutter function, the AE processing unit 103 also controls reset and read-out timings of the image sensor 107. An AF processing unit 106 drives a motor 105 according to focus adjustment processing (AF processing) to be described later, thereby driving the focus lens 104. A WB processing unit 114 applies white balance processing (WB processing) to an image signal which has undergone the image processing and is output from the image processing unit 109.

The operations of the image capturing apparatus with the aforementioned configuration will be described in detail below with reference to FIGS. 2 to 9.

Figure 2:
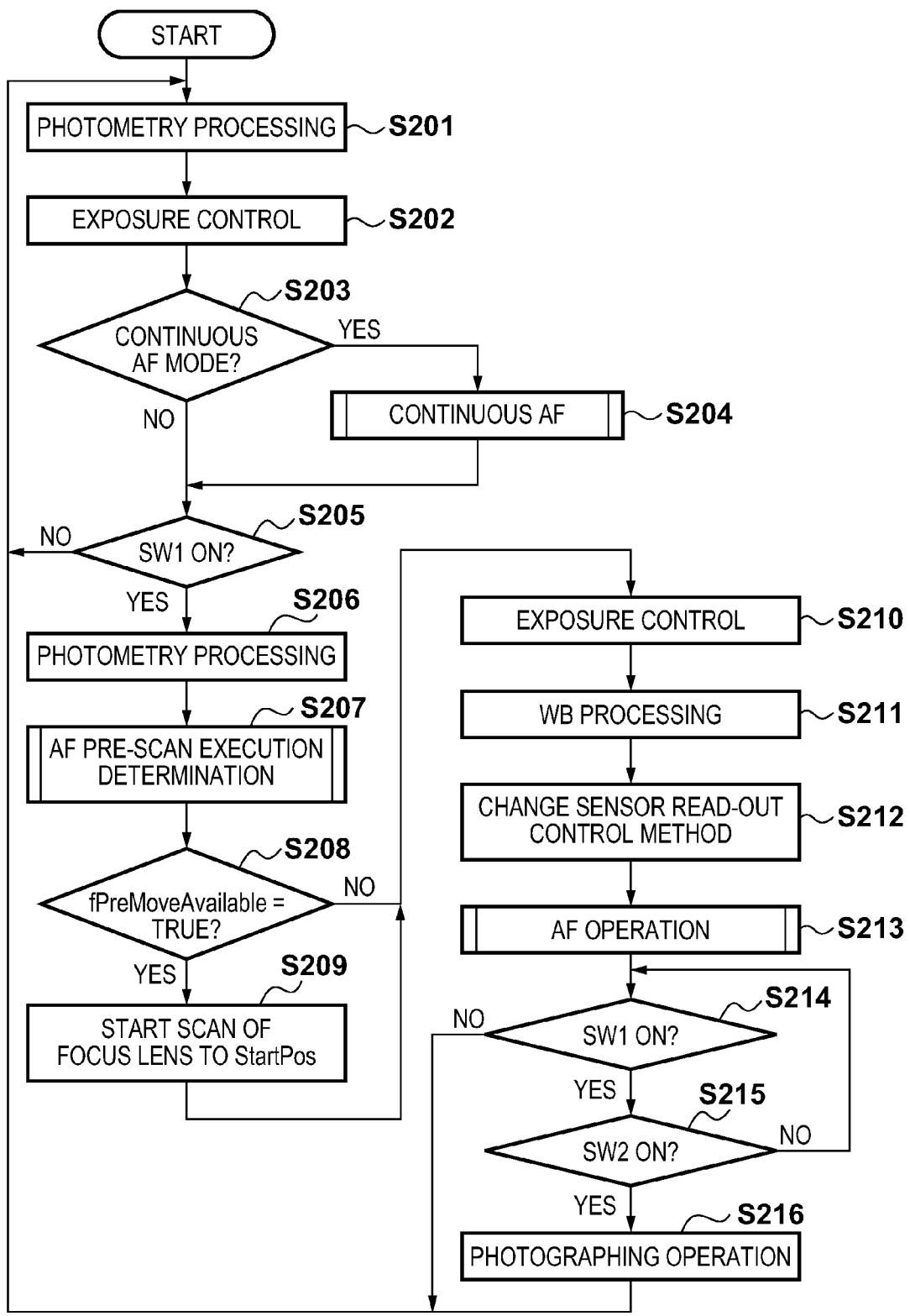
FIG. 2 is a flowchart for explaining an operation at an image sensing timing of the image capturing apparatus according to the embodiment.

FIG. 2 is a flowchart for explaining an operation at an image sensing timing of the image capturing apparatus to which the embodiment of the present invention is applied. In step S201, the AE processing unit 103 executes photometry processing based on an output from the image processing unit 109, and calculates an AE evaluation value for exposure control. In step S202, the AE processing unit 103 executes exposure control by changing a shutter speed, aperture, and sensitivity based on the AE evaluation value calculated in step S201. The process then advances to step S203. It is checked in step S203 whether or not a continuous AF mode for driving the focus lens 104 to always approach an in-focus state based on a focus evaluation value calculated from images periodically sensed by the image sensor 107 is set. If the continuous AF mode is set, the process advances to step S204 to execute continuous AF processing (to be described later). The process then advances to step S205. If the continuous AF mode is not set, the process directly advances to step S205.

In step S205, a state of the SW1 (120) is checked. If the SW1 is ON, the process advances to step S206; otherwise, the process returns to step S201 to repeat the aforementioned processing. In step S206, the AE processing unit 103 executes photometry processing based on an output from the image processing unit 109 and calculates an AE evaluation value for exposure control. Then, the process advances to step S207. In step S207, AF pre-scan execution determination processing (to be described later) for setting a start position StartPos of an AF scan range of the focus lens 104 is executed based on the current photographing mode, focal length, focus state, a distance to an object, and the like, and the process then advances to step S208. Note that if the start position of the AF scan range can be set in this AF pre-scan execution determination processing in step S207, "TRUE" is set in a flag fPreMoveAvailable; if the start position cannot be set, "FALSE" is set in the flag fPreMoveAvailable.

It is checked in step S208 whether or not this flag fPreMoveAvailable is TRUE. If the flag is TRUE, the process advances to step S209; otherwise, the process advances to step S210. In step S209, a scan of the focus lens 104 to the AF scan start position StartPos set in step S207 is started, and the process then advances to step S210. Note that the scan of the focus lens 104 to the start position StartPos of the AF scan range and processes of steps S210 to S212 (to be described below) are executed parallelly. In this manner, an AF time lag can be shortened by a parallel processing amount. Also, since the focus lens 104 is not scanned during the photometry processing in step S206, it does not affect the precision of the photometry processing.

In step S210, exposure control is executed by changing a shutter speed, aperture, and sensitivity based on the AE evaluation value calculated in step S206, and the process then advances to step S211. In step S211, the WB processing unit 114 applies WB processing to an output from the image processing unit 109, and the process then advances to step S212. In step S212, a sensor read-out control method is changed to the method suited to the AF control, and the process advances to step S213. In step S213, an AF operation (to be described later) is executed, and the process advances to step S214. In step S214, a state of the SW1 is checked. If the SW1 is ON, the process advances to step S215; otherwise, the process returns to step S201. In step S215, a state of the SW2 is checked. If the SW2 is ON, the process advances to step S216 to execute a photographing operation. After that, the process returns to step S201. If the SW2 is not ON, the process returns to step S214.

Figure 3:
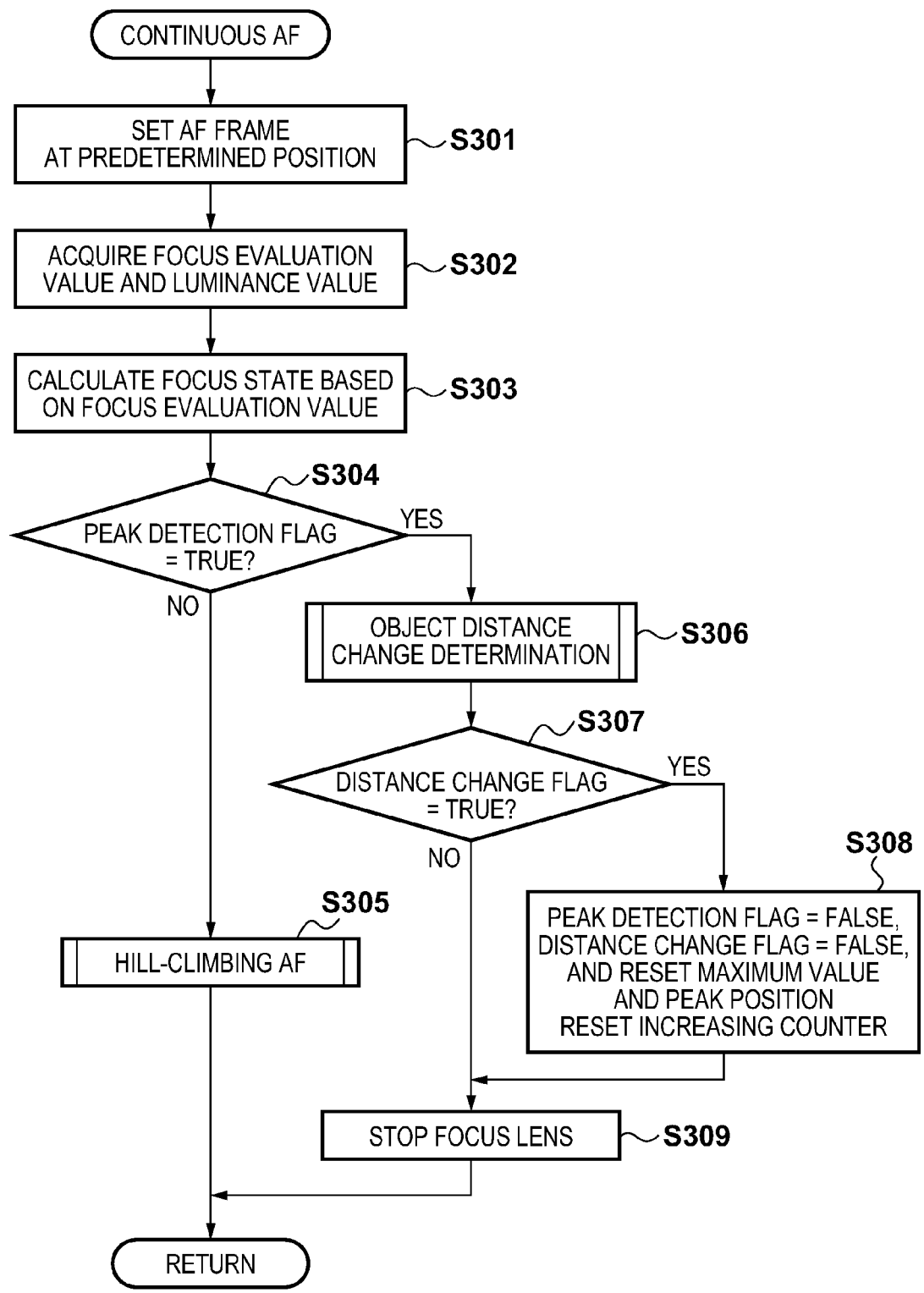
FIG. 3 is a flowchart for explaining continuous AF processing according to the embodiment.

FIG. 3 is a flowchart for explaining the continuous AF processing executed in step S204 of FIG. 2. In step S301, an AF frame is set at a predetermined position such as a central area, and the process advances to step S302. In step S302, a focus evaluation value and luminance value of the AF frame set in step S301 are acquired, and the process then advances to step S303. In step S303, a focus state is calculated based on the focus evaluation value acquired in step S302, and the process advances to step S304. In step S304, a state of a peak detection flag, which is set in hill-climbing AF in step S305 (to be described below) in the previous routine and indicates that a peak is detected, is checked. If the peak detection flag is TRUE, the process advances to step S306; otherwise, the process advances to step S305. In step S305, hill-climbing AF (to be described later) is executed, thus ending this sequence. Then, the process returns to step S205 of FIG. 2.

In step S306, object distance change determination processing (to be described later) is executed, and the process advances to step S307. In step S307, a state of a distance change flag indicating that a distance to an object is changed is checked. If the distance change flag is TRUE, the process advances to step S308; otherwise, the process advances to step S309. In step S308, "FALSE" is set in the peak detection flag and distance change flag, and a maximum value of a focus evaluation value, a peak position, and an increasing counter indicating an increasing count of the focus evaluation value, which are used in the hill-climbing AF subroutine in step S305, are reset. Then, the process advances to step S309. As will be described later, when the peak detection flag is TRUE, the focus lens 104 is moved to the peak position, and is stopped. In step S309, this sequence ends while the focus lens 104 is stopped, and the process returns to step S205 of FIG. 2.

Figure 4:
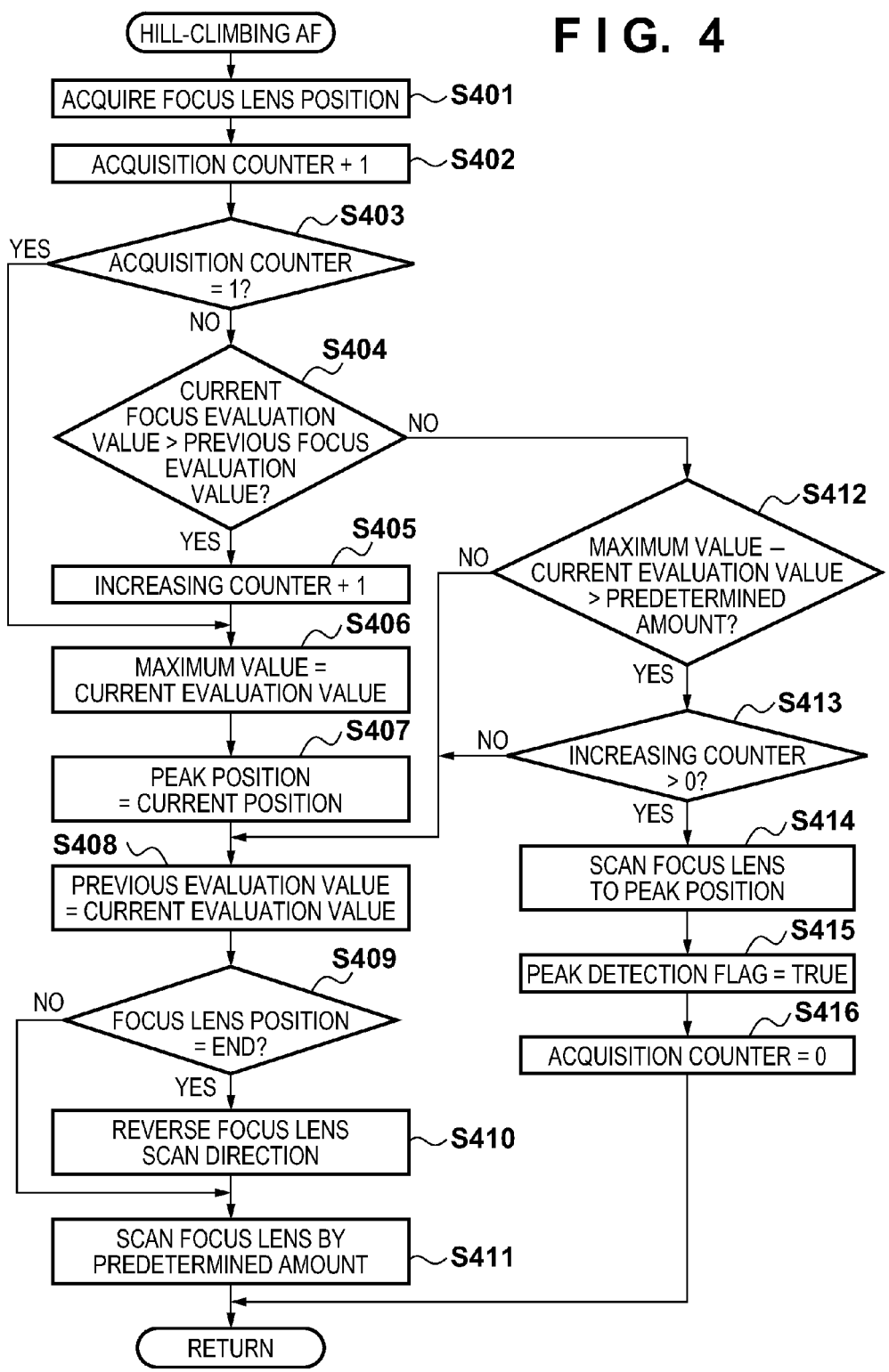
FIG. 4 is a flowchart for explaining hill-climbing AF processing according to the embodiment.

FIG. 4 is a flowchart for explaining the hill-climbing AF processing executed in step S305 of FIG. 3. In step S401, the current position of the focus lens 104 is acquired, and the process advances to step S402. In step S402, an acquisition counter used to count acquisition of a focus evaluation value/luminance value and that of the current position of the focus lens 104 is incremented by 1, and the process advances to step S403. Assume that this acquisition counter is set in advance to zero in an initialization processing executed, for example, when the power source of the camera is turned on. It is checked in step S403 whether or not the value of the acquisition counter is 1. If the value of the acquisition counter is 1, the process jumps to step S406; otherwise, the process advances to step S404.

It is checked in step S404 if the current focus evaluation value obtained in step S302 of FIG. 3 of the current routine is larger than the previous focus evaluation value obtained in the previous routine. If the current focus evaluation value is larger than the previous focus evaluation value, the process advances to step S405; otherwise, the process advances to step S412. In step S405, the increasing counter indicating that the current focus evaluation value is larger than the previous focus evaluation value is incremented by 1, and the process advances to step S406. In step S406, the current focus evaluation value is stored in an arithmetic memory (not shown) in the system control unit 113 as a maximum value of a focus evaluation value, and the process then advances to step S407. In step S407, the current position of the focus lens 104 is stored in the arithmetic memory (not shown) in the system control unit 113 as a peak position of a focus evaluation value, and the process then advances to step S408. Furthermore, in step S408, the current focus evaluation value is stored in the arithmetic memory (not shown) in the system control unit 113 as the previous focus evaluation value, and the process then advances to step S409.

It is checked in step S409 whether or not the current position of the focus lens 104 is the end of the AF scan range. If the current position is the end of the AF scan range, the process advances to step S410 to reverse a scan direction of the focus lens 104. Then, the process advances to step S411. If the current position is not the end of the AF scan range, the process jumps to step S411, and the focus lens 104 is moved by a predetermined amount, thus ending this sequence. Then, the process returns to step S205.

On the other hand, if the current focus evaluation value is not larger than the previous focus evaluation value in step S404, it is checked in step S412 whether or not "maximum value of focus evaluation value"–"current focus evaluation value" is larger than a predetermined amount. If "maximum value of focus evaluation value"–"current focus evaluation value" is larger than the predetermined amount, the process advances to step S413; otherwise, the process returns to step S408. It is checked in step S413 whether or not the increasing counter is larger than 0. If the increasing counter is larger than 0, the process advances to step S414; otherwise, the process returns to step S408. In step S414, the focus lens 104 is scanned to the peak position where the focus evaluation value stored in step S407 assumes a maximum value, and the process then advances to step S415. In step S415, "TRUE" is set in the peak detection flag. After that, the acquisition counter is reset to zero in step S416, thus ending this sequence. The process then returns to step S205.

Figure 5:
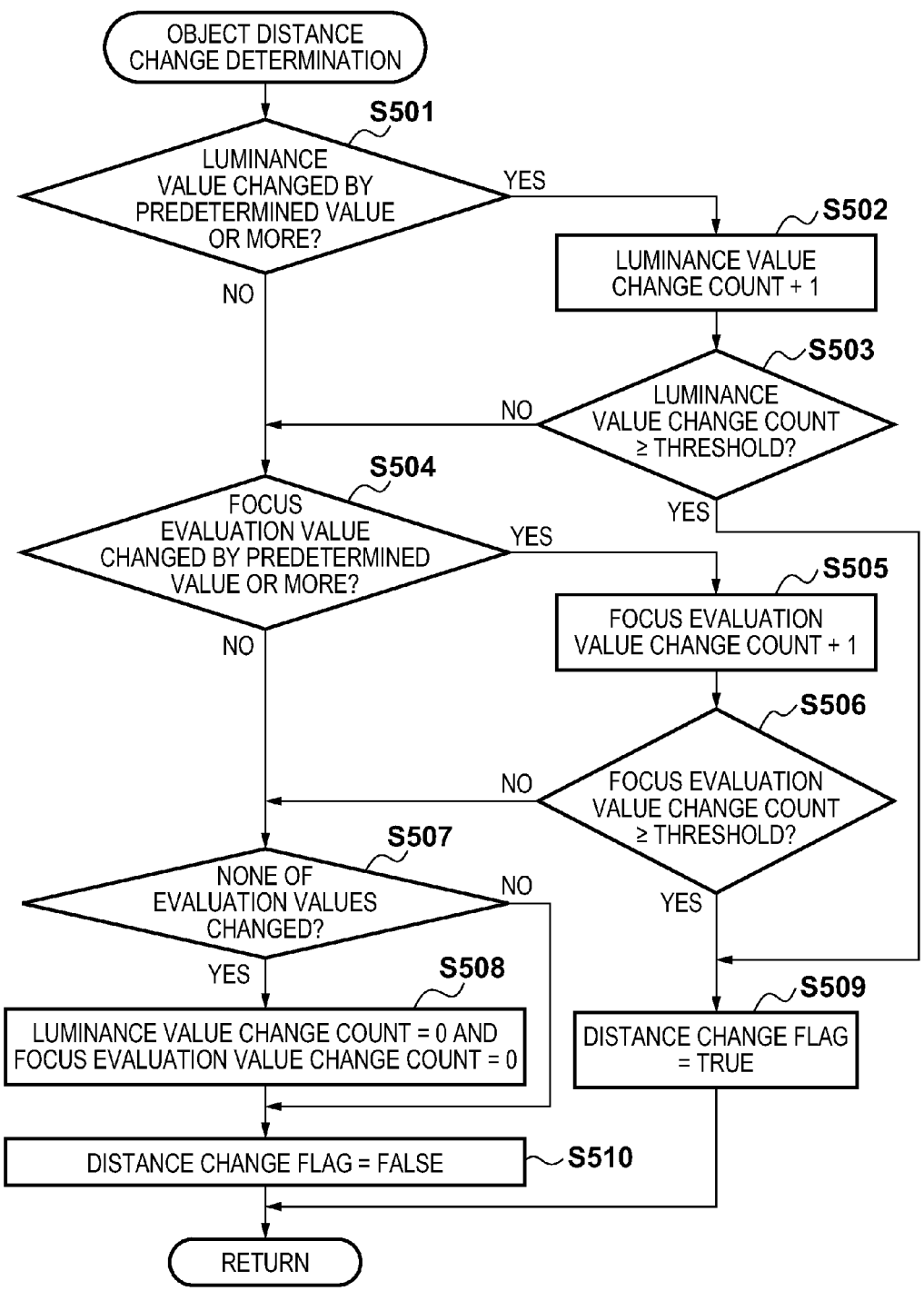
FIG. 5 is a flowchart for explaining object distance change determination processing according to the embodiment.

FIG. 5 is a flowchart for explaining the object distance change determination processing executed in step S306 of FIG. 3. It is checked in step S501 whether or not the luminance value acquired in step 302 in the current routine has changed by a predetermined value or more with respect to that of the AF frame acquired in step S302 in the previous routine. If the luminance value has changed by the predetermined value or more, the process advances to step S502; otherwise, the process advances to step S504. In step S502, a luminance value change count is incremented by 1, and the process advances to step S503 to check if the luminance value change count is not less than a threshold. If the luminance value change count is not less than the threshold, the process advances to step S509. If the luminance value has changed the predetermined number of times or more, it is considered that an object may be moving to be closer to or farther from the camera to change the distance, or an object in the AF frame may continuously change due to panning or zooming. Therefore, in this case, "TRUE" is set in the distance change flag indicating whether or not the distance has changed, thus ending this sequence. Then, the process returns to step S307. On the other hand, if the luminance value change count is less than the threshold in step S503, the process advances to step S504.

It is checked in step S504 whether or not the focus evaluation value acquired in S302 in the current routine has changed by a predetermined value or more with respect to that acquired in step S302 in the previous routine. If the focus evaluation value has changed by the predetermined value or more, the process advances to step S505; otherwise, the process advances to step S507. In step S505, a focus evaluation value change count is incremented by 1, and the process advances to step S506 to check whether or not the focus evaluation value change count is not less than a threshold. If the focus evaluation value change count is not less than the threshold, the process advances to step S509. In this case, although the change in luminance value is small, since a focal point position continuously changes by the predetermined value or more, "TRUE" is set in the distance change flag. On the other hand, if the focus evaluation value change count is less than the threshold in step S506, the process advances to step S507.

It is checked in step S507 whether or not neither the luminance value nor the focus evaluation value has changed. If neither the luminance value nor the focus evaluation value has changed, the process advances to step S508 to reset the luminance value change count and focus evaluation value change count to zero. Then, the process advances to step S510. On the other hand, if at least one of the luminance value and focus evaluation value has changed, the process jumps to step S510. In step S510, "FALSE" is set in the distance change flag, thus ending this sequence. Then, the process returns to step S307 of FIG. 3.

Figure 6:
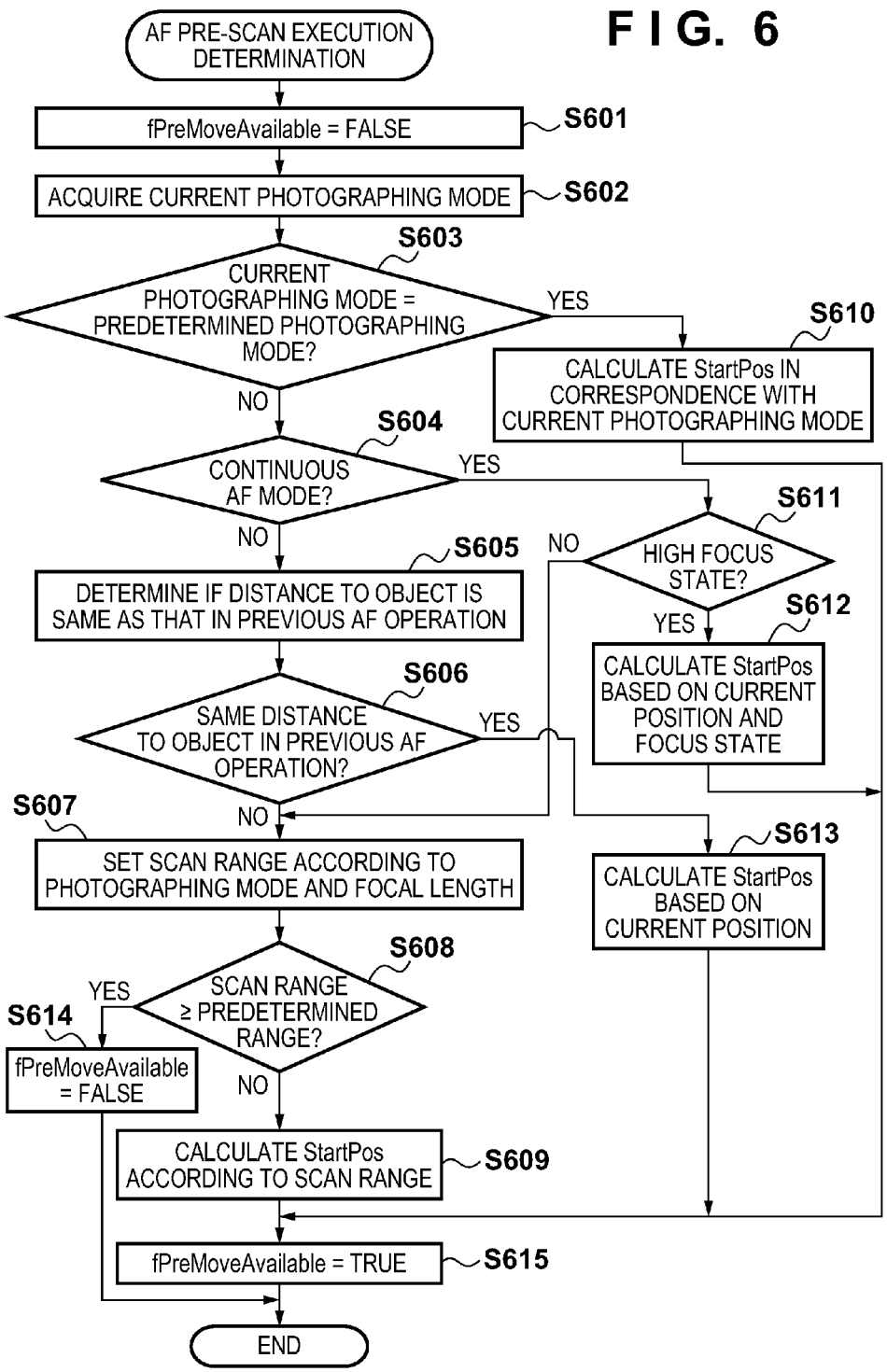
FIG. 6 is a flowchart for explaining AF pre-scan execution determination processing according to the embodiment.

FIG. 6 is a flowchart for explaining the AF pre-scan execution determination processing executed in step S207 of FIG. 2. In step S601, the flag fPreMoveAvailable indicating the determination result as to whether or not the focus lens 104 is scanned to the AF scan start position prior to the AF operation in step S213 is initialized to "FALSE", and the process then advances to step S602. In step S602, the photographing mode is acquired from the current camera settings, and the process advances to step S603. It is checked in step S603 whether or not the photographing mode acquired in step S602 is a predetermined photographing mode. If the acquired photographing mode is the predetermined photographing mode, the process advances to step S610; otherwise, the process advances to step S604. Assume that the predetermined photographing mode is to execute AF control for AF-scanning a predetermined range with reference to the current position of the focus lens 104. In step S610, a start position StartPos of an AF scan range corresponding to the current photographing mode and focal length is calculated, and the process advances to step S615.

It is checked in step S604 if the continuous AF mode is currently set. If the continuous AF mode is currently set, the process advances to step S611; otherwise, the process advances to step S605. It is checked in step S611 whether or not the focus state calculated in step S303 is higher than a predetermined value. If the focus state is higher than the predetermined value, the process advances to step S612; otherwise, the process advances to step S607. In this case, when the focus state is high in the continuous AF mode, since it is judged that an object is already nearly in focus, the AF operation (to be described later) AF-scans a predetermined narrow range according to the focus state with reference to the current position of the focus lens 104. In step S612, a start position StartPos of an AF scan range is calculated based on the current position of the focus lens 104 and the focus state calculated in step S303, and the process then advances to step S615.

It is determined in step S605 based on conditions such as the luminance value and elapsed time since the previous AF operation whether or not the object was in focus in the previous AF operation, and the current distance to the object is the same as the in-focus distance to the object, and the process advances to step S606. In this case, if it is determined that the current distance to the object is the same as that in the previous AF operation, since it is judged that the object is already in focus, a predetermined narrow range is AF-scanned with reference to the current position of the focus lens 104 in the AF operation (to be described later). It is checked in step S606 as a result of the determination process of step S605 whether or not the distance to the object is the same as that in the previous AF operation. If YES in step S606, the process advances to step S613; otherwise, the process advances to step S607. In step S613, a start position StartPos of an AF scan range is calculated based on the current position of the focus lens 104, and the process advances to step S615.

In step S607, an AF scan range according to the current photographing mode and focal length is acquired, and the process advances to step S608. It is checked in step S608 whether or not the AF scan range acquired in step S607 is not less than a predetermined range. If the acquired AF scan range is not less than the predetermined range, the process advances to step S614; otherwise, the process advances to step S609. In this case, when the AF scan range is broad, a pre-scan range in step S704, which will be described later with reference to FIG. 7, may often be broadened in the AF operation in step S213 of FIG. 2. Hence, if a focus position of the object can be judged based on a focus evaluation value acquired during a pre-scan, an AF scan is immediately started, thus shortening an AF time lag. On the other hand, when the AF scan range is narrow, since a pre-scan range is also narrowed down, it is difficult to judge a focus position of the object based on a focus evaluation value acquired during a pre-scan, and the focus evaluation value cannot be effectively used. As a result, the focus lens is scanned wastefully. Hence, the predetermined range is determined in advance in consideration of whether or not a focus evaluation value acquired during a pre-scan can be effectively used. In step S609, a start position StartPos of an AF scan range is calculated according to the scan range acquired in step S607, and the process advances to step S615.

"FALSE" is set in the flag fPreMoveAvailable in step S614, or "TRUE" is set in the flag fPreMoveAvailable in step S615, thus ending this sequence. Then, the process advances to step S208.

In this way, when the focus evaluation value acquired during a scan of the focus lens 104 to the AF scan start position is not used, "TRUE" is set in the flag fPreMoveAvailable. Then, by executing in advance the scan of the focus lens 104 to the AF scan start position before the beginning of the AF operation (to be described later), an AF time lag can be shortened.

Figure 7:
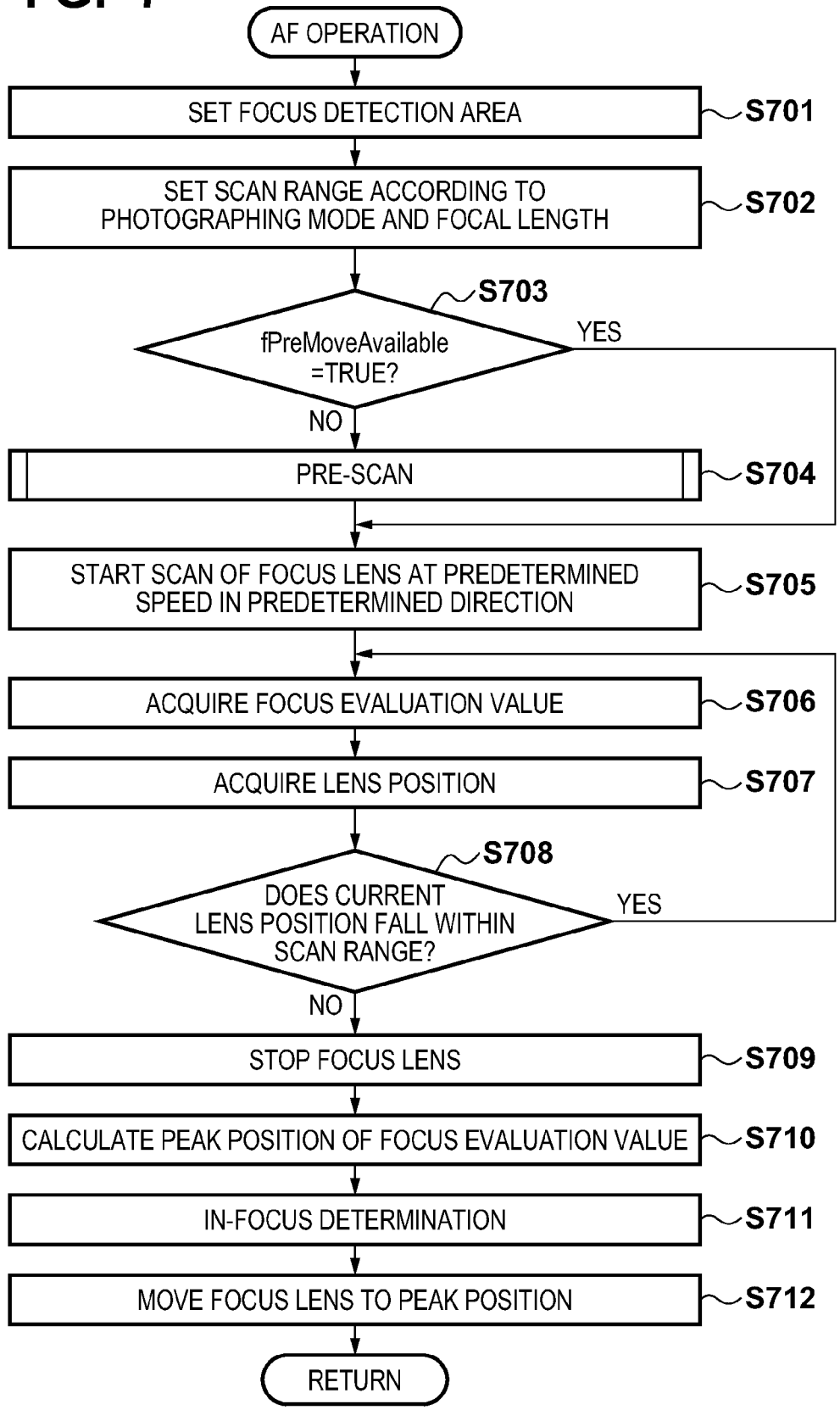
FIG. 7 is a flowchart for explaining an AF operation according to the embodiment.

FIG. 7 is a flowchart for explaining the AF operation executed in step S213 of FIG. 2. In step S701, a focus detection area is set in a predetermined area in a frame, and the process advances to step S702. In step S702, an AF scan range is set according to the photographing mode and focal length, and the process advances to step S703. A state of the flag fPreMoveAvailable determined in step S207 is checked in step S703. If the flag fPreMoveAvailable is TRUE, the process jumps to step S705; if it is FALSE, the process advances to step S704. In this manner, when the focus lens 104 has been scanned in advance to the start position StartPos of the AF scan range in step S209, the pre-scan control can be skipped. In step S704, pre-scan processing (to be described later) is executed, and the process advances to step S705. In step S705, the scan of the focus lens 104 is started at a predetermined speed in a predetermined direction, and the process advances to step S706. In this case, when the pre-scan is executed in step S704, a direction opposite to the scan direction is set as the predetermined direction. In step S706, a focus evaluation value in the focus detection area set in step S701 is acquired, and the process advances to step S707. In step S707, the current position of the focus lens 104 is acquired, and the process advances to step S708.

It is checked in step S708 whether or not the current position of the focus lens 104 acquired in step S707 falls within the AF scan range set in step S702. If the current position falls within the AF scan range, the process returns to step S706; otherwise, the process advances to step S709. A series of operations in steps S706 to S708 is executed within a time period for one frame at the current frame rate. Also, the focus evaluation value acquired in step S706 is associated with the lens position acquired in step S707, and is used to calculate a peak position of the focus evaluation value in step S710 (to be described later). In this case, since the focus lens 104 is driven during acquisition of the focus evaluation value, the focus lens position is calculated at a central timing of an exposure time, and is associated with the focus evaluation value.

If the position of the focus lens 104 falls outside the AF scan range in step S708, that is, if the scan of the AF scan range ends, the process advances to step S709 to stop driving of the focus lens 104. Then, the process advances to step S710. In step S710, a peak position of the focus evaluation value is calculated using the focus evaluation value acquired in step S706 and the corresponding position of the focus lens 104 (acquired in step S707), and the process advances to step S711. In step S711, in-focus determination is executed, and the process advances to step S712. In step S712, the focus lens 104 is driven to the peak position of the focus evaluation value calculated in step S710, thus ending this sequence. Then, the process returns to step S214 of FIG. 2.

Figure 8:
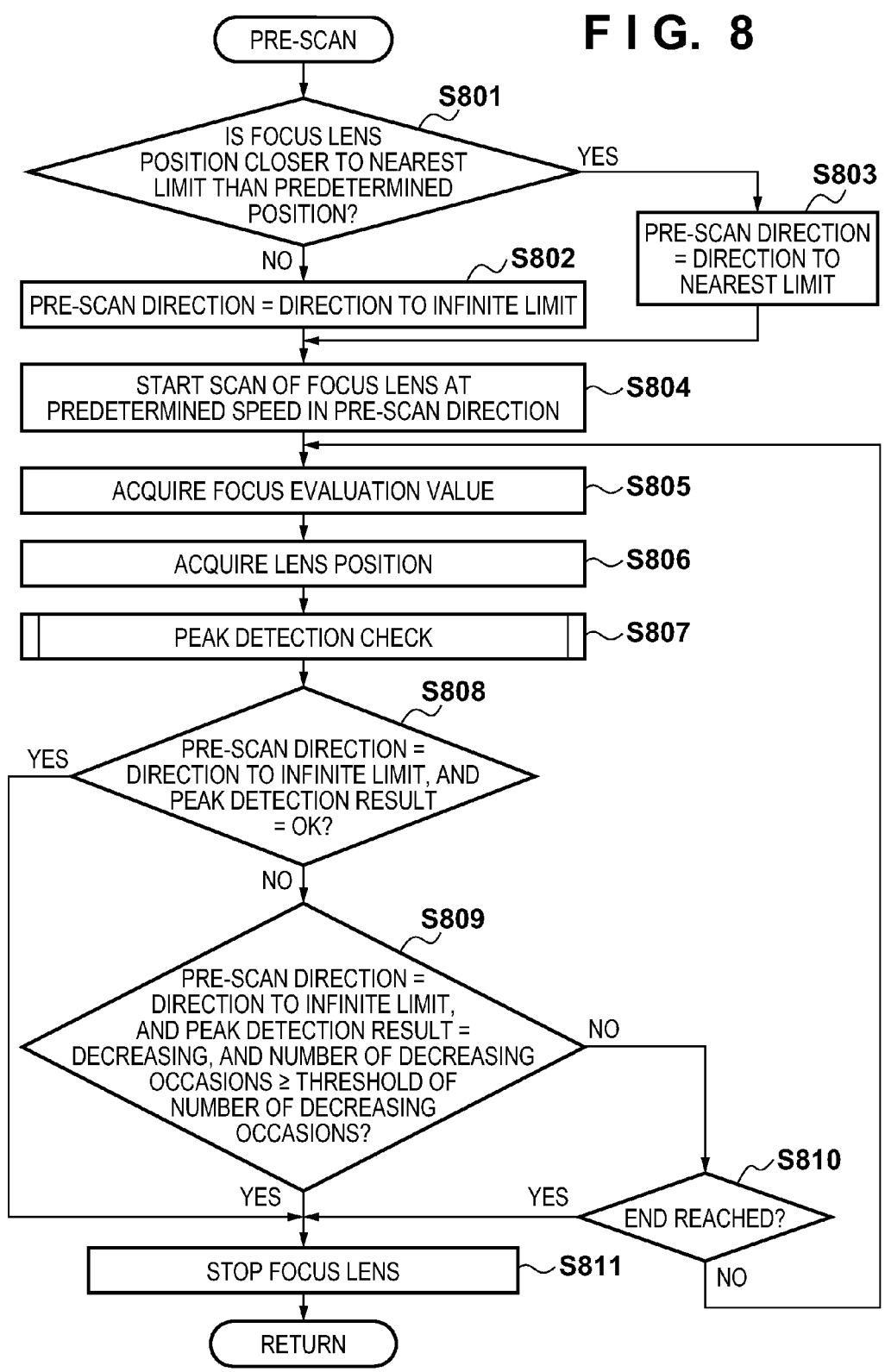
FIG. 8 is a flowchart for explaining pre-scan processing according to the embodiment.

FIG. 8 is a flowchart for explaining the pre-scan processing executed in step S704 of FIG. 7. It is checked in step S801 whether or not the current position of the focus lens 104 is a position to be in focus with an object located closer to the camera side (direction to a nearest limit) than a predetermined position. If YES in step S801, the process advances to step S803; otherwise, the process advances to step S802. Note that the predetermined value is determined to shorten a total AF time based on a statistical value of a photographing scene or a distance to the object, a focal length, and a zoom ratio. In step S802, the pre-scan direction of the focus lens 104 is set in a direction (direction to an infinite limit) to be in focus with an object farther than the current position of the focus lens 104, and the process advances to step S804. In step S803, the pre-scan direction of the focus lens 104 is set in a direction (direction to a nearest limit) to be in focus with an object closer than the current position of the focus lens 104, and the process advances to step S804. In step S804, a scan of the focus lens 104 is started at a predetermined speed in a predetermined direction, and the process advances to step S805.

In step S805, a focus evaluation value in the focus detection area set in step S701 is acquired, and the process advances to step S806. In step S806, the current position of the focus lens 104 is acquired, and the process advances to step S807. In step S807, peak detection check processing (to be described later) is executed, and the process advances to step S808. It is checked in step S808 whether or not the pre-scan direction is a direction to an infinite limit, and a peak detection result checked in step S807 is OK. If YES in step S808, the process jumps to step S811; otherwise, the process advances to step S809. It is checked in step S809 whether or not the pre-scan direction is a direction to an infinite limit, a peak detection result checked in step S807 is set as "decreasing", and the number of decreasing occasions is larger than a threshold of the number of decreasing occasions. If YES in step S809, the process advances to step S811; otherwise, the process advances to step S810. It is checked in step S810 whether or not the current position of the focus lens 104 reaches the end of the traveling direction. If YES in step S810, the process advances to step S811; otherwise, the process returns to step S805 to repeat the aforementioned processing. In step S811, the focus lens 104 is stopped, thus ending this sequence. Then, the process returns to step S705 of FIG. 7.

FIG. 9 is a flowchart for explaining the peak detection check processing executed in step S807 of FIG. 8. In step S901, a maximum value and minimum value of focus evaluation values acquired so far in step S805 are obtained and stored, and the process advances to step S902. It is checked in step S902 whether or not the currently acquired focus evaluation value is increased by a predetermined amount or more with respect to the previously acquired focus evaluation value. If the currently acquired focus evaluation value is increased, the process advances to step S903; otherwise, the process advances to step S906.

In step S903, the number of decreasing occasions is cleared to zero, and the process advances to step S904. In step S904, the number of increasing occasions is incremented by 1, and the process advances to step S905. In step S905, a peak detection result="increasing" is set, thus ending this sequence. Then, the process returns to step S808 of FIG. 8.

On the other hand, it is checked in step S906 whether or not the current focus evaluation value is decreased by an amount larger than a predetermined amount with respect to the previous focus evaluation value. If YES in step S906, the process advances to step S907; otherwise, the process advances to step S913. In step S913, a peak detection result="no change" is set, thus ending this sequence. Then, the process returns to step S808 of FIG. 8.

It is checked in step S907 whether or not the number of increasing occasions is not less than 1, and the current focus evaluation value is decreased by a predetermined ratio or more from the maximum value of the focus evaluation value stored in step S901, and a difference between the maximum value and minimum value stored in step S901 is not less than a predetermined amount, and a peak position is not the end of focus evaluation value data acquired so far. If all the conditions are satisfied, the process advances to step S911; otherwise, the process advances to step S908. In step S908, the number of increasing occasions is cleared to zero. In step S909, the number of decreasing occasions is incremented by 1. In step S910, a peak detection result="decreasing" is set, thus ending this sequence. Then, the process returns to step S808. In step S911, a peak position as a position of the focus lens 104 at which the focus evaluation value assumes a peak value is calculated based on the focus evaluation values and lens positions obtained so far. In step S912, a peak detection result="OK" is set, thus ending this sequence, and the process returns to step S808.

As described above, according to this embodiment, after execution of the photometry processing, the focus lens 104 is scanned to the start position of the AF scan range, which is set based on the current photographing mode, focal length, focus state, distance to an object, and the like. During the scan to the start position of the AF scan range, the exposure control and WB processing based on the photometry processing are executed parallelly. On the other hand, when the start position of the AF scan range cannot be set based on the current photographing mode, focal length, focus state, distance to an object, and the like, the focus lens 104 is driven while acquiring focus evaluation values, thus determining the start position at an earliest timing. In this manner, an AF time lag can be efficiently shortened without affecting processing other than the AF control.

OTHER EMBODIMENTS

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-275106, filed on Dec. 17, 2012 which is hereby incorporated by reference herein in its entirety.

What is claimed is:

1. A focus adjustment apparatus comprising:
   a determination unit configured to determine a start position of a predetermined scan range of a focus lens;
   a focus adjustment unit configured to execute focus adjustment processing by driving the focus lens based on focus evaluation values calculated respectively for periodically sensed images while scanning the focus lens in one-way direction within the predetermined scan range;
   a first processing unit configured to execute processing, an operation of which is affected by driving of the focus lens;
   a second processing unit configured to execute processing, an operation of which is not affected by driving of the focus lens; and
   a control unit configured to control the first processing unit to execute the processing without calculating the focus evaluation values for periodically sensed images before the focus lens is scanned from a current position to the start position, and to control the second processing unit to execute the processing without calculating the focus evaluation values for periodically sensed images during the scan of the focus lens from the current position to the start position, if the determination unit succeeds to determine the start position.

2. The apparatus according to claim 1, wherein the first processing unit is a photometry unit, and the second processing unit includes an exposure control unit configured to control exposure according to a photometry result of the photometry unit.

3. The apparatus according to claim 1, wherein the second processing unit includes at least one of a white balance processing unit configured to execute white balance processing and a changing unit configured to change a sensor read-out control method.

4. The apparatus according to claim 1, wherein if the determination unit fails to determine the start position, said control unit controls the first processing unit and the second processing unit to execute the processing, and then controls the focus adjustment unit to determine the start position of the scan range based on focus evaluation values calculated respectively for periodically sensed images while scanning the focus lens in either of a direction to a nearest limit or a direction to an infinite limit based on a current position of the focus lens.

5. The apparatus according to claim 1, wherein the determination unit determines the start position of the scan range based on a photographing mode, a focal length, a focus state, and a distance to an object.

6. The apparatus according to claim 5, wherein the focus adjustment unit executes the focus adjustment processing after a photographing preparation instruction is input.

7. The apparatus according to claim 6, wherein if the photographing mode is a predetermined photographing mode in which focus adjustment processing is executed to have a predetermined range as the scan range with reference to a position of the focus lens, the determination unit determines the start position of the scan range based on a position of the focus lens and the focal length at the photographing preparation instruction input timing.

8. The apparatus according to claim 7, wherein if the photographing mode is a continuous AF mode in which the focus lens is driven based on focus evaluation values calculated from periodically sensed images before the photographing preparation instruction is input, and a focus state at the photographing preparation instruction input timing is higher than a threshold, the determination unit determines the start position of the scan range based on a position of the focus lens and the focus state at the photographing preparation instruction input timing.

9. The apparatus according to claim 8, wherein if the photographing mode is neither the predetermined photographing mode nor the continuous AF mode, and if a distance to an object which was in focus in the previous focus adjustment processing by the focus adjustment unit and a distance to an object at the photographing preparation instruction input timing fall within a predetermined range, the determination unit determines the start position of the scan range based on a position of the focus lens at the photographing preparation instruction input timing.

10. The apparatus according to claim 6, wherein if the determination unit calculates the scan range based on the photographing mode and the focal length at the photographing preparation instruction input timing, and the scan range is narrower than a predetermined range, the determination unit determines the start position of the scan range.

11. An image capturing apparatus comprising:
    an image sensor configured to sense an image; and
    a focus adjustment apparatus comprising:
      a determination unit configured to determine a start position of a predetermined scan range of a focus lens,
      a focus adjustment unit configured to execute focus adjustment processing by driving the focus lens based on focus evaluation values calculated respectively for periodically sensed images while scanning the focus lens in one-way direction within the predetermined scan range;
      a first processing unit configured to execute processing, an operation of which is affected by driving of the focus lens;
      a second processing unit configured to execute processing, an operation of which is not affected by driving of the focus lens; and
      a control unit configured to control the first processing unit to execute the processing without calculating the focus evaluation values for periodically sensed images before the focus lens is scanned from a current position to the start position, and to control the second processing unit to execute the processing without calculating the focus evaluation values for periodically sensed images during the scan of the focus lens from the current position to the start position, if the determination unit succeeds to determine the start position.

12. The apparatus according to claim 11, further comprising:
    the focus lens; and
    a driving unit configured to drive the focus lens under the control of the focus adjustment unit.

13. A focus adjustment method of executing focus adjustment processing by driving a focus lens based on focus evaluation values calculated respectively for periodically sensed images while scanning the focus lens within a predetermined scan range, the method characterized by comprising:
- a determination step of determining a start position of the predetermined scan range of the focus lens;
- a focus adjustment step of executing focus adjustment processing by driving the focus lens based on focus evaluation values calculated respectively for periodically sensed images while scanning the focus lens in one-way direction within the predetermined scan range;
- a first processing step of executing processing, an operation of which is affected by driving of the focus lens, before the focus lens is scanned to the start position;
- a second processing step of executing processing, an operation of which is not affected by driving of the focus lens, while the focus lens is scanned to the start position;
- a control step of controlling the first processing step to execute the processing without calculating the focus evaluation values for periodically sensed images before the focus lens is scanned from a current position to the start position, and controlling the second processing step to execute the processing without calculating the focus evaluation values for periodically sensed images during the scan of the focus lens from the current position to the start position, if the determination step succeeds to determine the start position.

14. A non-transitory readable storage medium having stored thereon a program which is executable by an image processing apparatus, the program having a program code for performing a focus adjustment method of executing focus adjustment processing by driving a focus lens based on focus evaluation values calculated respectively for periodically sensed images while scanning the focus lens within a predetermined scan range, the method characterized by comprising:
- a determination step of determining a start position of the predetermined scan range of the focus lens;
- a focus adjustment step of executing focus adjustment processing by driving the focus lens based on focus evaluation values calculated respectively for periodically sensed images while scanning the focus lens in one-way direction within the predetermined scan range;
- a first processing step of executing processing, an operation of which is affected by driving of the focus lens, before the focus lens is scanned to the start position;
- a second processing step of executing processing, an operation of which is not affected by driving of the focus lens, while the focus lens is scanned to the start position; and
- a control step of controlling the first processing step to execute the processing without calculating the focus evaluation values for periodically sensed images before the focus lens is scanned from a current position to the start position, and controlling the second processing step to execute the processing without calculating the focus evaluation values for periodically sensed images during the scan of the focus lens from the current position to the start position, if the determination step succeeds to determine the start position.

* * * * *